Nov. 17, 1942.     A. J. TICKELL     2,302,072
WARNING SIGNAL FOR REFRIGERATORS AND THE LIKE
Filed Feb. 28, 1939
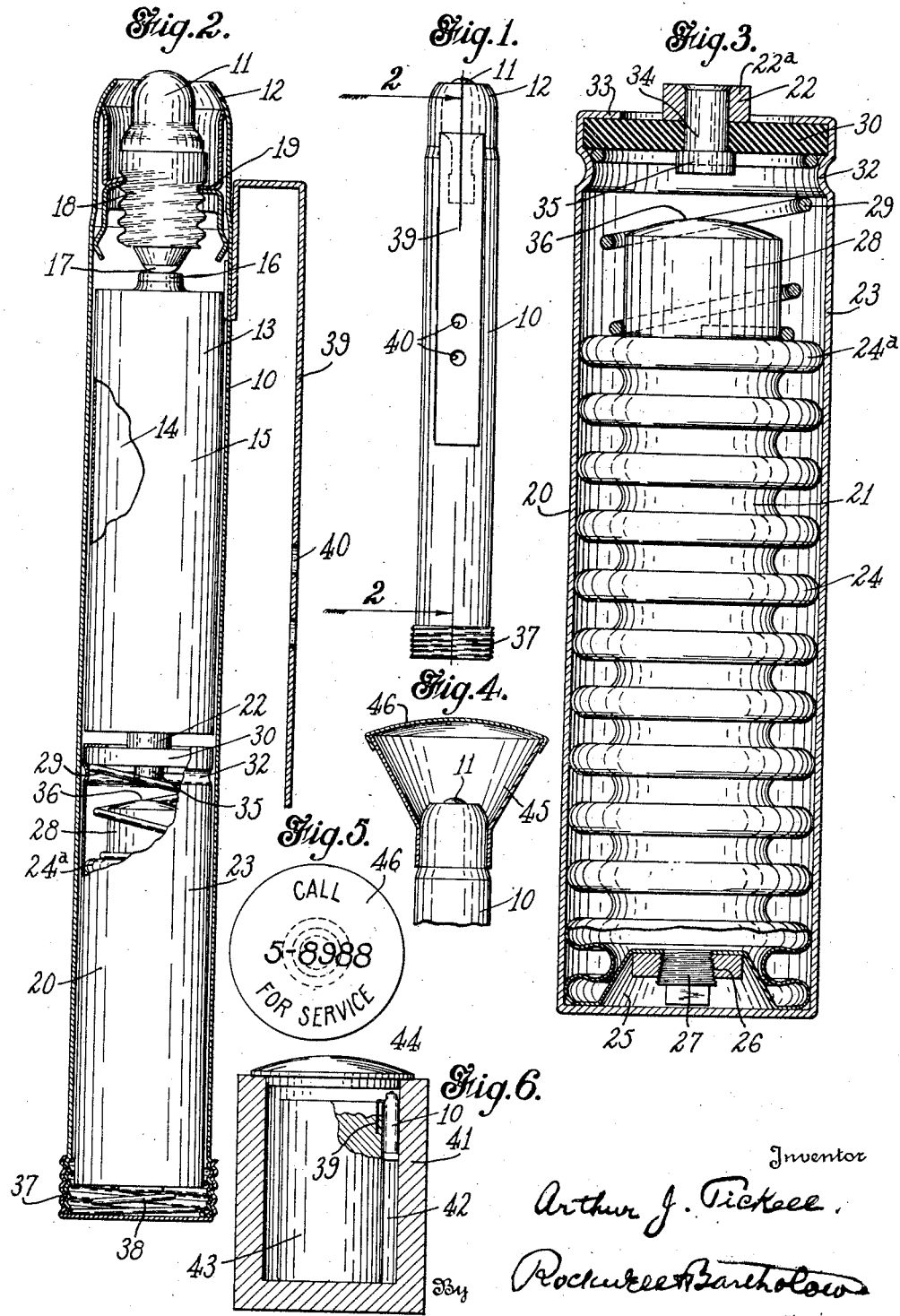

Patented Nov. 17, 1942

2,302,072

UNITED STATES PATENT OFFICE 2,302,072

WARNING SIGNAL FOR REFRIGERATORS AND THE LIKE

Arthur J. Tickell, Hamden, Conn.

Application February 28, 1939, Serial No. 259,004

4 Claims. (Cl. 177—311)

This invention relates to a warning signal for automatic indication of a detrimental temperature change within a confined space. It is especially applicable to refrigerators, and more specifically commercial refrigerators, although it is likewise adapted to domestic use.

When commercial refrigerators, such as used, for example, in storing foods, ice cream and the like in retail stores, get out of order, so that the temperature in the storage space rises above the allowable maximum, there is likely to be spoilage involving financial loss, owing to the fact that considerable time may elapse before the failure of refrigeration is discovered. For some time there is no visual indication of the fact that the apparatus is out of order.

One of the objects of my invention is the provision of simple, inexpensive and convenient means providing an effective signal whenever the temperature within a confined space passes a predetermined limit, and more particularly a predetermined upper limit.

Another object is to furnish a portable warning signal device adapted to be easily introduced into and stored within refrigerators of various types, and to give a signal, as by the lighting of a small electric bulb, at such time as the temperature within the refrigerator rises to a predetermined degree.

Another object which I have in view is the provision of a device so constructed as to be adjustable in an accurate manner at the factory to any of a number of different temperature limits as may be desired under the prevailing conditions.

In the accompanying drawing:

Fig. 1 is a side elevation of a device embodying my invention;

Fig. 2 is a longitudinal sectional view partly broken away and on a larger scale, the same being taken on line 2—2 of Fig. 1;

Fig. 3 is an enlarged sectional view of a preferred form of thermoresponsive element for closing the signalling circuit;

Figs. 4 and 5 are, respectively, a longitudinal sectional view and a top plan view of a signal device of somewhat modified form; and Fig. 6 is a sectional view on a smaller scale illustrating how the device of Figs. 1 and 2 can be used in an ice cream cabinet or refrigerator.

In its preferred form, the warning signal of my invention is a small, readily portable device comparable in size and appearance to a small battery-operated flashlight and comprising a casing equipped with a small incandescent bulb, and with one or more interior dry cells for effecting illumination of the bulb. In the drawing the casing is shown at 10, and the same is illustrated as being cylindrical, although not necessarily so, and as equipped at the upper end with a bulb 11 partly shrouded and protected by a casing extension 12, which causes the rays of light to be concentrated to a certain extent. Within the upper part of the casing and adjacent the bulb is a dry cell battery 13, in this case embodying a single cell, said cell being of a size to fit snugly within the casing, and being provided over its metallic body 14 with a covering 15 at the side of the cell, which serves to insulate the latter from the metallic conducting casing 10. The cell 13 may be of the usual construction, and as usual it may have a central insulated contact 16 of metal making contact with the central contact 17 of the bulb, whereas the other pole of the bulb is constituted by the metallic threaded mounting shell 18 of the latter. This shell 18 establishes electrical connection with the metal casing 10 by being screwed directly into a suitable socket member 19, which is in electrical connection with the body of the casing.

Within the lower part of the casing 10, and in proximity to the bottom of the dry cell 13, is a thermoresponsive means indicated generally at 20. The office of this means is to close the circuit of the light bulb or other signal element, when the temperature within the refrigerator space rises beyond a predetermined limit, and more particularly the function is to establish electrical connection between the wall of casing 10 and the metal bottom wall of dry cell 13, so that the circuit will be completed. The particular construction of the thermostatic means 20 may vary, but I prefer to use in the device a novel unit comprising three principal parts, namely, a longitudinally extensible gas-filled bellows 21; an insulated contact member 22 adapted to lie in contact with the bottom of the dry cell, and in turn to be contacted by the bellows when the temperature reaches a predetermined point; and a capsule or shell 23 mounting the member 22, and in which member 21 is contained.

The bellows 21 is preferably of the accordion type, comprising a hollow body of thin metal having parallel circumferential ridges or ribs 24. At its lower end the bellows is provided with a recessed portion 25 having an opening 26 through which methyl chloride or other suitable gas may be introduced, after which the opening is closed by a screw-threaded plug 27 located within the lower recessed portion of the bellows. At its upper end the bellows has an integral substantially cylindrical extension 28 embraced by a coiled spring 29 reacting against the uppermost rib 24ª of the bellows and against a disk 30 of fibrous or other suitable insulating material, which disk serves as a mounting for the contact member 22 previously mentioned. The bellows is encased and closely surrounded by a capsule or shell 23 of thin metal such as brass, the insulating disk 30 being fixedly mounted in the upper or mouthed portion of the capsule. In the particular case illustrated, disk 30 rests against a rib 32 formed in the wall of the capsule adjacent its upper end, and against the upper face of the disk lies a flange 33 formed by bending down the upper edge portion of the capsule against the insulating disk. The upper end portion of spring 29 rests against the lower face of the disk, and adjacent the bead or rib 32. The contact member 22, previously mentioned, comprises a stud 34 passing through the insulating disk and having a head 35 at its lower end, and having a contact member 22ª riveted or clinched to the upper end thereof. The extension 28 of the bellows has a crowned upper end portion 36 adapted to make contact at its center with the under surface of member 35 when the gas within the bellows reaches a predetermined temperature.

The lower end of the main casing 10 is adapted to be closed by means such as a removable screw cap 37, and between the body of this cap and the lower end of the thermostat element 20 a spring 36 is interposed. The effect of this spring is to urge contact member 22 into contact and hold it in contact with the bottom of dry cell 13.

The operation of the device when the temperature within the bellows reaches a predetermined upper limit will be readily understood from the foregoing description. All that is necessary in order to close the light bulb circuit is to establish electrical connection between the metal wall of the casing and the bottom of the dry cell, and this takes place when the upper end of the bellows establishes contact with member 22, because the metal capsule 23 is in electrical connection with the casing and the bellows in electrical connection with the capsule, and all that remains to be done to close the circuit is to establish connection between the bellows and the insulated contact member 22.

When the device is used in connection with the refrigeration of ordinary foods, the thermostat element is adjusted to establish contact between the bellows and the insulated contact member when the temperature rises, say, to 45° Fahrenheit. When this occurs the light bulb is illuminated, and anyone having access to the refrigerator can see that something is wrong, and if necessary, call for the service man. If desired, the light bulb can be of a red color. When the device is employed in connection with the refrigeration of ice cream, it will be set to give a warning signal when the temperature in the ice cream cabinet rises, say, beyond 10° Fahrenheit.

It will be seen that for supporting the device in the refrigerator, a clip 39 of suitable form may be employed. This clip can be made of bent sheet metal and can be attached to the casing of the device in the location shown in Fig. 2, for example, by welding it to the casing. The clip or bracket 39 can, if desired, be provided with suitable perforations 40 permitting the device to be attached to a suitable supporting wall by suitable screws or other fastening elements, not shown. One use of the clip 39 is shown in Fig. 6, where I have illustrated, simply by way of example, a mode of mounting the warning signal device in a refrigerating cabinet used for storing ice cream. In this view the cabinet body, which can be refrigerated in any suitable manner, is indicated at 41, and the same has a storage space 42 for an ice cream can 43. The signal device can be hooked over the upper edge of the can 43 by means of the clip 39, with the body of the signal device in the space between the outer surface of the can and the inner surface of the cabinet wall. In this case the light bulb 11 will be pointed upwardly in a space adjacent the upper edge of the can, and will be visible at once upon the removal of the cover 44 of the compartment within which the ice cream is stored. Hence, if the bulb is illuminated, an indication of the breakdown of the refrigerating system will be given as soon as the cover of the compartment is lifted off. This particular mounting of the device, however, is referred to simply by way of example, for the clip 39 could be hooked over a cooling coil or the like, or it could be attached to a suitable support by fastening screws or the like.

In the modified form shown in Figs. 4 and 5, an attachment is applied to the upper end of a casing such as that previously described. This attachment comprises a flaring adapter member 45, which can be made of hard rubber or the like, and is frictionally fitted at its smaller end over the body of the casing, so as to be carried thereby. At its larger end the flaring adapter or support serves as a mounting for a transparent wall 46, which can be made of Celluloid or the like, and this wall provides for lettering, such as shown in Fig. 5, which will be thrown into relief when the bulb is illuminated, and which is fairly large in comparison to the diameter of the metal casing, and can include, for example, the telephone number of the service man, as illustrated, or, if desired, this transparent wall 46 or its equivalent may carry advertising matter or the like.

By using the form of thermostatic element shown in Fig. 3, the device can be readily adjusted at the factory to make contact at any of a number of different desired temperatures. For adjusting the device to different temperatures, springs of different strengths can be used for holding the bellows yieldingly against the bottom of its enclosing shell; or, where different temperature settings are required for different conditions, the length of the enclosing shell or capsule can be changed. By factory methods well understood, the device can be set very closely to a predetermined temperature at which the device will operate. The variation from this temperature will be very small, and in practice negligible, and the device can be constructed for different respective temperature settings varying through quite a wide range without the necessity of keeping in stock a large number of different parts.

It is of distinct advantage to have the bellows or other thermostatic element and its cooperating contact member built into a unit maintaining them in a definite relation. For one thing, the assemblage of these parts within the casing 10 is made very simple, as will be manifest. Also there is little likelihood of the device getting out of adjustment or out of order. The capsule of brass or like metal can be readily formed by cupping and drawing operations, and the insulating member can be mounted in the mouth portion of the capsule by operations conveniently performed, which insure the necessary accuracy of manufacture. The thermostatic unit may be of a shape and size similar to that of dry cell 13, as shown. However, while I have shown the thermostatic unit comprising the bellows, the cooperating contact, and the shell or case as generally of elongated cylindrical shape which adapts it to the particular enclosing case shown in the drawing, I do not limit myself in this respect.

It will be understood that while I have shown a visual signal element exemplified by an incandescent bulb, I may in some cases employ an audible signal in place of a visual one, and in some instances I may employ both a visual signal and an audible signal. Also in some cases instead of employing either a visual signal or an audible signal in connection with the casing containing the battery and thermostatic element, I may employ the device as a circuit closer, for example, which will operate a relay controlling electrical apparatus operating at a higher voltage. Also it will be understood that the thermal member or element need not be of bellows type in all cases. Various changes in these and other respects can be made in the details without departure from the principles of my invention or the scope of the appended claims.

What I claim is:

1. A warning signal device for refrigerators and the like intended to give visual warning when the temperature within a refrigerating chamber or like space is exceeded, comprising a small portable casing adapted to be inserted into and removed from the chamber and to occupy a minimum amount of space therein, said casing being of elongated cylindrical shape and of electrically conductive material and carrying an incandescent bulb adjacent one end, the opposite end of the casing being a closed end, said bulb having two contacts of which one is connected to said casing, a dry cell within the casing having a pole contact connected with the other contact of the bulb and provided with a metallic shell electrically insulated from said casing, the bottom of said shell being free of insulation and spaced a substantial distance from the closed end of the casing, and means disposed in the casing between its closed end and the bottom of the dry cell for positioning the dry cell with respect to the bulb and for establishing and disestablishing electrical connection between the rear end portion of the casing and the bottom of the dry cell, said last-named means including a hollow thermoresponsive member adapted to be extended lengthwise of the casing to close the bulb circuit when a predetermined temperature limit is reached and adapted when the temperature is lowered to be contracted in a lengthwise direction so as to break the bulb circuit.

2. A warning signal device for refrigerators and the like comprising a small portable casing of electrically conductive material adapted to be inserted into and removed from a refrigerating chamber, a light bulb carried by said casing and having two contacts of which one is in electrical connection with the casing, a dry cell within the casing having a pole contact in contact with the other contact of the bulb and provided with a metallic shell insulated from the casing, the bottom of said cell being free of insulation, a contact member insulated from the casing in engagement with the bottom of the cell, means for positioning said contact member with respect to the casing so that it is held in engagement with the cell and the cell in turn held in operative relation to the bulb, the rear end of said casing being closed, and a longitudinally extensible conducting heat-responsive element arranged in the space between said contact member and the closed rear end of said casing and in electrical connection with said casing and adapted upon a predetermined temperature rise within the casing to make contact with said insulated contact member to thereby complete the bulb circuit and illuminate the bulb.

3. A warning signal device for refrigerators and the like intended to give visual warning when the temperature within a refrigerating chamber or like space is exceeded, comprising a small portable casing adapted to be inserted into and removed from the chamber and to occupy a minimum amount of space therein, said casing being of elongated cylindrical shape and of electrically conductive material and carrying an incandescent bulb adjacent one end, the opposite end of the casing being a closed end, said bulb having two contacts of which one is connected to said casing, a dry cell within the casing having a pole contact connected with the other contact of the bulb and provided with a metallic shell electrically insulated from said casing, the bottom of said shell being free of insulation and spaced a substantial distance from the closed end of the casing, and means disposed in the casing between its closed end and the bottom of the dry cell for positioning the dry cell with respect to the bulb and for establishing and disestablishing electrical connection between the rear end portion of the casing and the bottom of the dry cell, said last-named means including a hollow conducting bellows arranged in the space between the dry cell and the closed rear end of the casing and having its rear end restrained against longitudinal movement and its forward or inner end free to move in the direction of the dry cell bottom to close the circuit upon a predetermined rise of temperature and to move away from the dry cell bottom to open the circuit when the temperature is again lowered.

4. A warning signal device for refrigerators and the like comprising a small portable casing of electrically conductive material adapted to be inserted into and removed from a refrigerating chamber, an incandescent bulb carried by said casing adjacent one end and having two contacts of which one is in electrical connection with the casing, said casing being of cylindrical elongated form and closed at the other end, a dry cell within the casing having a pole contact in contact with the other contact of the bulb and provided with a metallic shell insulated from the casing, the bottom of said cell being free of insulation and spaced at a substantial distance from the closed end of the casing, and a capsule member of substantially cylindrical external shape having a conducting wall located in the casing between the bottom of the dry cell and the closed end of the casing, said capsule member having adjacent its inner end an insulated contact in engagement with the bottom of the cell, and also having an internal longitudinally extensible hollow conducting heat-responsive element in electrical connection with the wall of the capsule and with the casing and having a movable inner end portion adapted to make contact with said insulated contact in order to close the bulb circuit.

ARTHUR J. TICKELL.